May 21, 1946.　　E. M. McELHINNEY　　2,400,836
COUPLING DEVICE
Filed March 9, 1944　　2 Sheets-Sheet 1
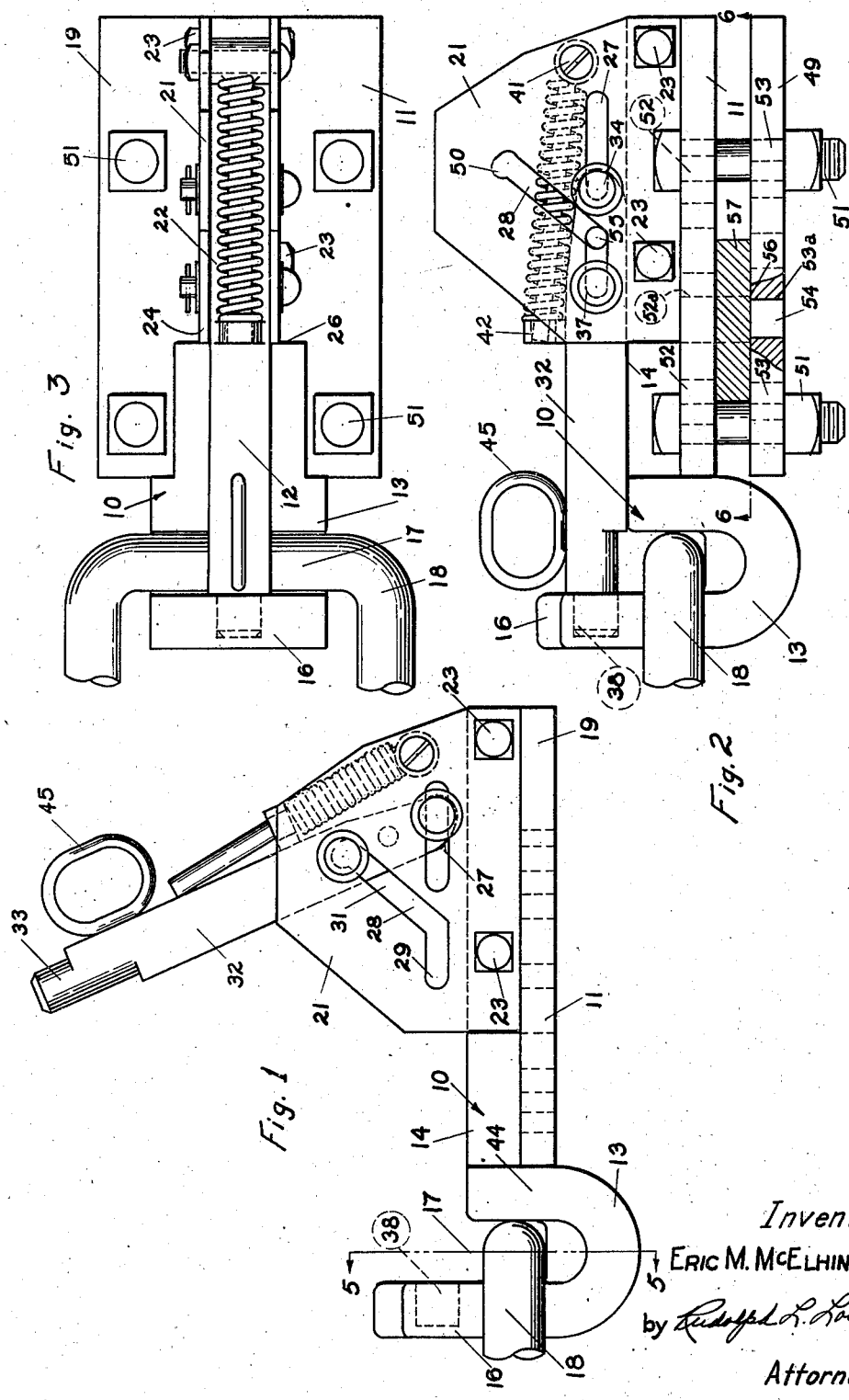
Inventor
Eric M. McElhinney
by Rudolph L. Lowell
Attorney

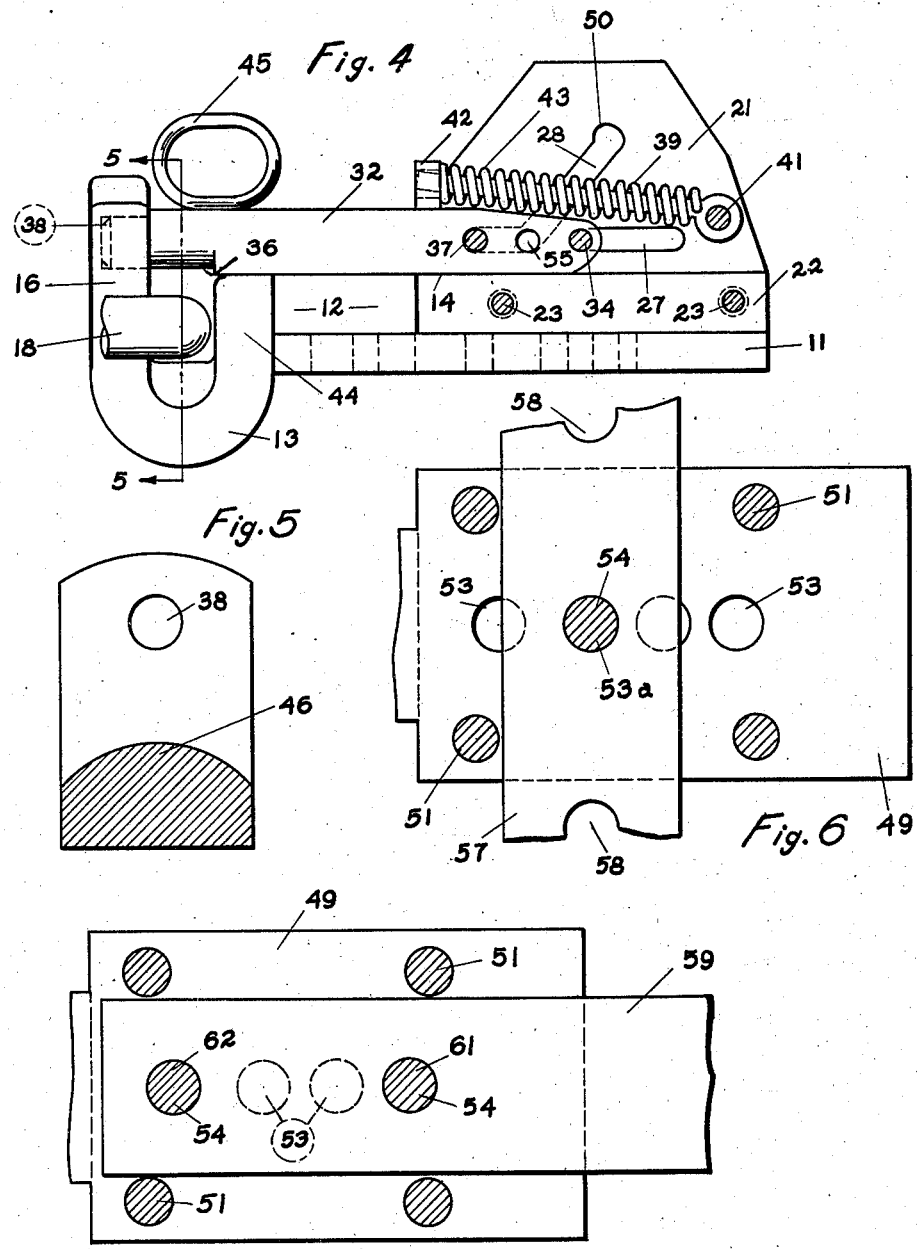

Patented May 21, 1946

2,400,836

UNITED STATES PATENT OFFICE 2,400,836

COUPLING DEVICE

Eric M. McElhinney, Dysart, Iowa

Application March 9, 1944, Serial No. 525,753

9 Claims. (Cl. 280—33.15)

This invention relates generally to coupling devices for connecting a trailer unit with a tractor unit.

An object of this invention is to provide an improved coupling device.

A further object of this invention is to provide a coupling device having a movable latch member in which the latch support is so constructed and assembled with the latch that only a single spring means is required to positively but releasably hold the latch in either a locked position or out of a locked position.

Another object of this invention is to provide a coupling device in which a latch and an associated spring holding unit are the only movable parts.

Yet a further object of this invention is to provide a coupling device in which a hook is operatively associated with a latch movably supported for pivotal movement into and out of a hook closing position, and for longitudinal movement in a hook closing position to a position locked against pivotal movement.

A feature of this invention is found in the provision of a coupling device, including a body member with a hook open to one side thereof, in which a movable latch is supported at one end of the body member for slidable movement longitudinally of the body member, and for pivotal movement toward and away from the one side of the body member into and out of a hook closing position, with the longitudinal movement of the latch locking it against pivotal movement in a hook closing position.

Yet another feature of this invention is found in the provision of a coupling device having a body member with a hook open to one side thereof, in which a latch is movably supported for pivotal movement to hook opening and closing positions substantially 90° apart, and for longitudinal movement in a hook closing position to a position where it is locked against pivotal movement, whereby a single spring unit is capable of yieldably holding the latch in either a hook opening position or a hook closing position.

Further objects, features and advantages of this invention will become apparent from the following description when taken in connection with the accompanying drawings in which:

Fig. 1 is a side elevational view of the coupling device of this invention showing the latch or keeper in a hook opening position;

Fig. 2 is illustrated similarly to Fig. 1 and shows the latch in a hook closing position and the coupling device relatively assembled with a tractor draw bar;

Fig. 3 is a top plan view of the coupling device;

Fig. 4 is a side elevational view of the coupling device with certain parts removed to more clearly show the construction and relative assembly of the latch and its associated holding spring;

Fig. 5 is a sectional view as seen along the line 5—5 in Figs. 1 and 4;

Fig. 6 is a sectional view taken on the line 6—6 in Fig. 2 and shows the coupling connected with a transversely extended draw bar; and Fig. 7 is a view illustrated similarly to Fig. 6 showing the coupling connected with a longitudinally extended draw bar.

Referring to the drawings the coupling of this invention is shown in Figs. 2 and 3 as including a body member 10 having a flat base member 11 and a centrally longitudinally extended upper member 12. Integrally formed at one end of the body member 10 is a transversely extended hook 13 which is open to the top side 14 of the body member 10. The free end 16 of the hook is substantially normal to the plane of the body member 10 and projected above the level of the top side 14. The hook opening 17 is of a size to loosely receive a hitch, indicated at 18, carried on a trailer unit (not shown) which hitch is positively but releasably locked in the hook 13 by means now to be described.

For the purpose of convenience and clarity in the description the hook 13 will be considered as being at the rear end of the body member 10. Adjacent the forward end 19 of the body member is a latch-supporting unit comprised of a pair of upright plate members 21 oppositely carried on a reduced portion 22 of the upper member 12 and secured with the member 12 by bolts 23. As is clearly indicated in Fig. 3 the ends 24 of the plate members 21 are positioned against shoulders 26 which define the rear end of the reduced portion 22 of the upper member 12. Each plate member 21 is of a like construction so that only one thereof will be referred to in detail.

A plate 21 is generally inwardly tapered toward its top, as viewed in Figs. 1 and 2, and is formed with a front slot 27 and a rear slot 28. The front or forward slot 27 is spaced above the top side 14 of the body member 10 and extends longitudinally of the body member. The rear slot 28 includes a portion 29 which is in substantially the horizontal plane of the front slot 27 and extends longitudinally of the body member 10. Continuous with the slot portion 29 is a slot portion 31 which is inclined upwardly and forwardly from the slot portion 29 at an angle of approximately 45°, to a position above the front slot 27. In the assembly of the plate members 21 with the body member 10 the slots 27 and 28 in one plate member are arranged opposite corresponding slots 27 and 28 in the other plate member.

Movably supported between the plate members 21 is a latch or keeper 32 of straight form (Figs. 1 and 4) which is of a substantially rectangular shape in cross section and formed with a rear end 33 of a rounded shape. A pivot pin 34 is extended through the forward end of the latch with opposite ends slidably received in the front slots 27. Rearwardly spaced from the pivot pin 34 and projected through the latch 32 is a guide pin 37, the opposite ends of which are slidably received in the rear slots 28. The pins 34 and 37 are spaced a distance apart such that when the latch is in its hook closing position, shown in Figs. 2 and 4, each pin 34 and 37 is adjacent the rear end of corresponding slots 27 and 28, respectively.

In the operation of the coupling device assume that the latch 32 is in its hook closing position illustrated in Figs. 2 and 4. At this position the latch 32 is arranged longitudinally of and substantially parallel to the body member 10 and adjacent to the top side 14 of the body member, with its rounded rear end 33 positioned within a cavity 38 formed in the forward side of the hook end 16 above the level of the body member top side 14.

By virtue of the location of the pins 34 and 37 at the rear ends of corresponding slots 27 and 28, and the location of the latch 32 between the plate members 21, the latch is locked against pivotal movement about the pivot 34. This position of the pins 34 and 37 at the rear ends of the slots 27 and 28 also defines the movement of the latch 32 longitudinally in a direction rearwardly of the body member 10. The reception of the rounded rear end 33 of the latch within the hook cavity 38 supplements the locking action of the pins 34 and 37 so that both ends of the latch 32 are acted upon to positively hold the latch so that it is only movable in a forward direction longitudinally of the body member 10.

The latch is releasably held in its hook closing position by a spring unit best shown in Fig. 4 and including a rod 39 pivoted at its forward end on a pivot pin 41 supported between the plate members 21 at a position above and forwardly of the front slots 27. The free end of the rod 39 is slidably supported in an eye member 42 integrally formed with the latch 32 and projected upwardly from its top side. Mounted on the rod 39 and arranged in compression between the eye member 42 and the pivot 41 is a spring member 43. When the latch 32 is in a hook closing position the rod 39 is substantially in a parallel relation with the latch 32 so that the pressure of the spring 43 is applied longitudinally of the latch against the eye member 42, whereby the latch 32 is yieldably maintained in its hook closing position and against longitudinal movement in a direction forwardly of the body member 10. To eliminate any possibility of a portion of the trailer unit being moved against the latch 32 so as to move the latch in a forward direction longitudinally of the body member 10, the cavity 38 is not extended completely through the free end 16 of the hook. As a result the rear side of the hook 13 is of a solid construction and functions as a guard for the latch 32.

Thus with the hitch member 18 within the hook 13 any force applied in a rearward direction on the hitch is exerted against the hook end 16, while a force applied on the hitch 18 in an opposite or forward direction is exerted against the fixed or forward end 44 of the hook. When the hitch 18 is moved upwardly within the hook against the latch 32 any tendency of the hitch to open the latch is counteracted by the engagement of the latch end 33 within the cavity 38, and the engagement of the pins 34 and 37 with the sides of the slots 27 and 28, respectively. As a result regardless of the application of a force in any direction on the hitch 18 the latch 32 is positively held against movement toward a hook opening position. The outwardly rounded construction of the latch side portion 36, which is opposite the hook bottom 46, when the latch is in hook-closing position, and the outwardly curved contour of the hook bottom 46 provides for a free rocking movement of the hitch 18 within the hook transversely of the body member 10.

To facilitate movement of the latch 32 to a hook opening position a hand or finger grip 45 is secured to the top of the latch 32 adjacent its rear end 33. When the latch 32 is gripped at the finger hold 45 it is manually movable longitudinally of the body member 10, and toward the right as viewed in Figs. 1 and 4, until the pin 37 is at the junction of the slot portions 29 and 31 of the rear slot 28. This longitudinal movement of the latch 32 is sufficient to move its rear end 33 completely out of the cavity 38.

On a continued manual movement of the latch 32, the latch is guidably moved by the slidable movement of the pin 37 in the slot portion 31 upwardly and away from the top side 14 of the body member 10, and in turn upwardly and forwardly away from the hook 13. By virtue of the straight incline of the slot portion 31 the pivot 34 moves longitudinally of the body member 10 and within the slot 27 during the movement of the latch 32 away from a hook closing position. It is thus seen, therefore, that although the latch 32 is pivoted about the pin 34, that the position of the pivot 34 within the slot 27 continuously changes due to the guided movement of the latch by the slot portions 31.

During the upward movement of the latch 32 to its hook opening position shown in Fig. 1, the spring 43 is progressively compressed by virtue of the slidable movement of the rod 39 within the eye member 42. However, since the rod 39 and the spring 43 are movable together with the latch 32, the pressure exerted on the latch by the spring 43 is continuously exerted in one direction longitudinally of the latch. When the pin 37 approaches the top or forward end of the slot 29 it is received within a notch 50. The spring 43 yieldably maintains the pin 37 in the notch 50 to in turn yieldably maintain the latch 32 in a hook opening position.

To return the latch 32 to a hook closing position it is only necessary to manually move the latch 32 until the pin 37 is out of the notch 50, at which time the spring 43 acts to automatically move the latch to its hook closing position shown in Fig. 4. The top side of the forward end of the latch 32 is of a tapered form to accommodate the spring 43 to prevent any binding action of the spring with the latch and to provide for the spring pressure being continuously applied in one direction longitudinally of the latch.

It is seen, therefore, that the latch is movable into and out of a hook closing position by the pivotal movement of the latch relative to the body member 10 and that the longitudinal movement of the latch positions the pin 37 within the portion 29 of the slot 28, and the latch end 33 within the cavity 38 so as to lock the latch against pivotal movement upwardly to a hook opening position. It is further apparent that this locking of the latch against upward movement is accomplished when the pin 37 is within the slot portion 29 and independently of the engagement of the latch end 33 within the cavity 28, which engagement supplements the locking function of the pins 34 and 37 and stabilizes the rear end 33 of the latch. In some instances it may be desirable to permanently lock the latch 32 in a hook closing position. This permanent locking is accomplished by the provision of a hole 55 extended through the latch 32 being the pivot pins 34 and 37. When the latch is in a hook-closing position the hole 55 is open to and in alignment with the slot portions 29. On insertion of a locking pin (not shown) through the slot portions 29 and hole 55 the latch is permanently locked against forward movement longitudinally of the body member 10.

The base member 11 cooperates with a removable plate member 49, shown in Fig. 2, for assembling the coupling device on a tractor unit. The base member 11 and plate 49 are of a substantially rectangular shape and are formed with corresponding holes adjacent each of their corners for receiving connecting bolts 51. The base member 11 and plate member 49 are further provided with a series of holes 52 and 53, respectively, spaced longitudinally of the coupling device and extended centrally of a corresponding base member 11 and plate member 49 for receiving connecting plugs 54, one of which is illustrated in Fig. 2. The plugs 54 are of a reduced diameter at one end to fit into the holes 53 of the plate member 49 and are retained between the base member 11 and the plate 49, while spacing these two members laterally apart from each other, by engagement of a shoulder 56 with the plate member 49.

Draw bars for tractor units are generally of two types, namely, extended either transversely or longitudinally of the tractor unit and in turn of the coupling device. When a transverse draw bar 57 (Figs. 2 and 6) is used, one of the longitudinally spaced holes 58 in the bar is aligned with the hole indicated as 52a in the base member 11 and a plug 54 is extended through the bar and into the central hole 52a. The plate member 49 is then placed adjacent the base member 11 with the reduced end of the plug 54 inserted within the hole 53a in the plate 49, after which the bolts 51 are tightened to hold the plate 49 in a spaced relation with the base member 11 so that the bar 57 is loosely pivoted on the plug 54 between the base member 11 and the plate member 49.

In the use of a longitudinally extended draw bar 59 (Fig. 7) a pair of openings 61 and 62 in the bar are aligned with a pair of corresponding holes 52 and 53 in the members 11 and 49, respectively, each series of holes 52 and 53 being unequally spaced so that the coupling may be readily connected to longitudinally extended bars having the holes therein spaced varying distances apart. A plug 54 is then extended through each hole 61 and 62 and positioned within and between the members 11 and 49, the same in all respects as was explained above for the transverse bar in Figs. 2 and 6.

From a consideration of the above description it is seen that the invention provides a coupling device which is of a rugged construction and comprised of but a relatively few number of parts of which only the latch 32 and its associated holding spring unit 39—43 are movable. Although the spring 43 is the only means used to yieldably maintain the latch 32 in a hook closing position, the relative assembly and construction of the latch 32 and coupling body member 10 are such that at no time is there any force applied on the latch 32 in a direction such that it requires any direct counter action by the spring 43. Only the single spring 43 is used to yieldably maintain the latch 32 in either a hook closing position or a hook opening position, since the spring pressure is continuously applied in a single direction longitudinally of the latch 32 with the latch being movable through substantially 90° to its two operating positions.

Although the invention has been described with respect to a preferred embodiment thereof it is to be understood that it is not to be so limited since modifications and changes can be made therein which are within the full intended scope of this invention as defined by the appended claims.

I claim:

1. A coupling device including a body member having a hook portion, a latch, means movably supporting said latch adjacent one end on said body member for pivotal movement toward and away from said body member into and out of a hook closing position, and for movement longitudinally of the body member in a hook closing position, and means cooperating with said supporting means to lock the latch against pivotal movement, on longitudinal movement of the latch in one direction.

2. A coupling device comprising a body member having a hook portion, a latch, means movably supporting said latch on said body member for pivotal movement toward and away from said body member into and out of a hook closing position and for longitudinal movement while in a hook closing position, means cooperating with said supporting means to lock said latch against pivotal movement on longitudinal movement thereof in one direction, and means for yieldably holding said latch against longitudinal movement in an opposite direction.

3. A coupling device comprising a body member having a hook open to one side thereof, a movable latch arranged in a substantially parallel relation with said one side when in a hook closing position, means on said body member supporting said latch for movement longitudinally of said one side while said latch is in a hook closing position, and for pivotal movement away from said one side to a hook opening position, with said latch on longitudinal movement in one direction, being locked with said supporting means against pivotal movement, and means for yieldably holding said latch against longitudinal movement in an opposite direction.

4. A coupling device comprising a body member having a hook open to one side thereof, a movable latch, latch-supporting means comprising a pair of upright members transversely spaced on said one side, projecting portions adjacent one end of said latch, said upright members having oppositely arranged slots therein, said latch being receivable between said upright members with said projections slidably movable in said slots to provide for a pivotal movement of said latch into and out of a hook closing position, and for longitudinal movement in a hook closing position, with said longitudinal movement locking said latch with said supporting means against pivotal movement when in a hook closing position, and means for yieldably holding said latch in each extreme moved position in said slots.

5. A coupling device including a body member having a hook open to one side thereof, a latch member, means movably supporting said latch member adjacent one end of said body member for pivotal movement toward and away from said one side into and out of a hook closing position, and for longitudinal movement when in a hook closing position, with said latch on longitudinal movement in one direction being locked with said supporting means against pivotal movement, an elongated member having one end pivoted on said supporting means adjacent said one end of the latch member, means on said latch member movably supporting said elongated member for pivotal movement with said latch member, and yieldable means arranged in compression between said last mentioned means and the pivoted end of said elongated member, said yieldable means in one position acting to hold said latch in a hook closing position against longitudinal movement in an opposite direction, and in a second position acting to hold said latch member in a hook opening position.

6. A coupling device including a body member having a hook open to one side thereof, a movable latch member arranged in a substantially parallel relation with said one side when in a hook closing position, with the free end of said hook having a cavity open to the inside of said hook, said latch having one end receivable in said cavity, means on said one side of the body member operatively connected adjacent the opposite end of said latch to guidably support said latch for longitudinal movement in a hook closing position to provide for movement of said one end into and out of said cavity, and for pivotal movement of said latch away from said hook to a hook opening position when said one end is out of said cavity.

7. A coupling device comprising a body member including a hook at one end, with the free end of said hook projected outwardly from one side of said body member, a movable latch, upright supporting means on said one side adjacent the opposite end of said body member, means adjacent one end of said latch guidably supported in said upright means to provide for said latch being pivotally movable into and out of a hook closing position and longitudinally movable when in a hook closing position, said free end of the hook having a cavity therein to receive the opposite end of said latch, when the latch is longitudinally moved in one direction in a hook closing position, to hold said latch against pivotal movement, and means movably supported on said upright means and operatively connected with said latch to yieldably hold the latch against longitudinal movement in an opposite direction.

8. A coupling device including a body member having a hook open to one side thereof, a movable latch member, said latch member in a hook closing position being in a substantially parallel relation with said one side of the body member, means guidably supporting said latch member on said body member for continuous movement longitudinally of said one side, while in a hook closing position, and for pivotal movement into and out of a hook closing position, said supporting means comprising a pair of upright members arranged on opposite sides of said latch, with each said uprights having a pair of slots with longitudinally extended portions, a pair of oppositely extended projections on said latch, with a pair of projections on one side of said latch being slidably movable in the pair of slots in a next adjacent upright member, with the longitudinal movement of said latch taking place when said projections are in longitudinal portions of corresponding slots to lock said latch in hook closing position against pivotal movement, and a single means for yieldably holding said latch against longitudinal movement in one direction and for yieldably holding said latch in a hook opening position, including a spring unit movably supported between said upright members and operatively connected with said latch to apply a pressure on said latch in one direction longitudinally thereof at all moved positions of said latch.

9. A coupling device comprising a body member having a hook open to one side thereof, a movable latch, a pair of uprights on said body member spaced to receive said latch therebetween, said uprights having oppositely arranged slots therein, with one pair of opposite slots extended longitudinally of said body member, and a second pair of opposite slots extended longitudinally and then upwardly from said body member, pivot means adjacent one end of said latch slidably movable in said one pair of slots, guide means on said latch slidably movable in said second pair of slots, said latch, when said guide means is in the longitudinal portions of said second pair of slots, being in a hook closing position and held in a substantially parallel relation with said one side by the cooperative action of said guide means and pivot means in associated slots, said latch, when the guide means is within the upwardly extended portions of said second pair of slots being pivotally movable outwardly from said one side to a hook opening position, and means for yieldably holding said latch in a hook opening position and in a hook closing position.

ERIC M. McELHINNEY.